Figure 2:
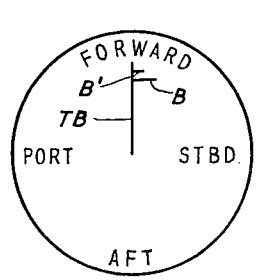

Sept. 19, 1961  J. WILD  3,001,188
ANTI-COLLISION RADIO EQUIPMENT FOR AIRCRAFT USE
Filed Oct. 23, 1958  3 Sheets-Sheet 1
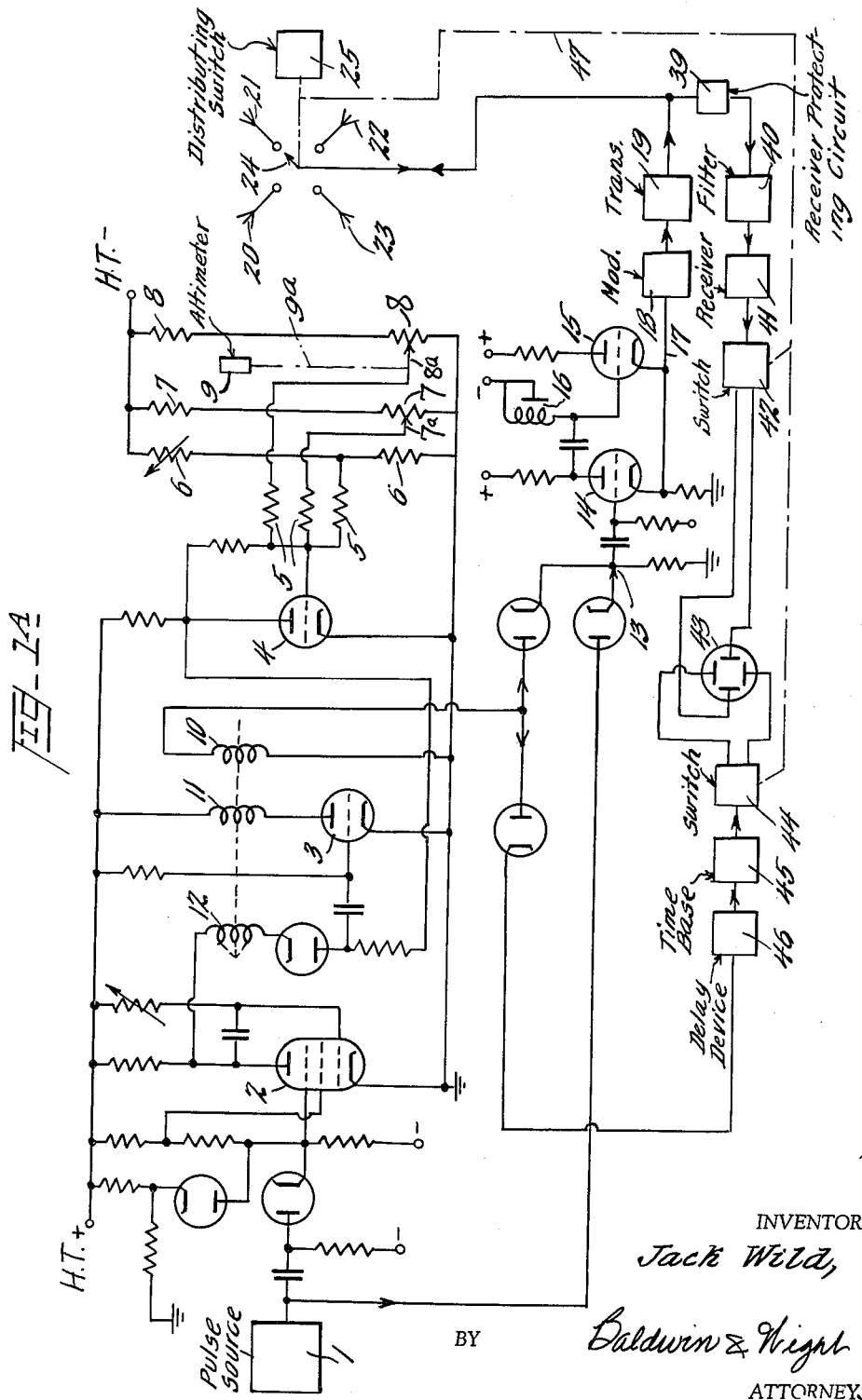
INVENTOR
Jack Wild,
BY Baldwin & Wight
ATTORNEYS

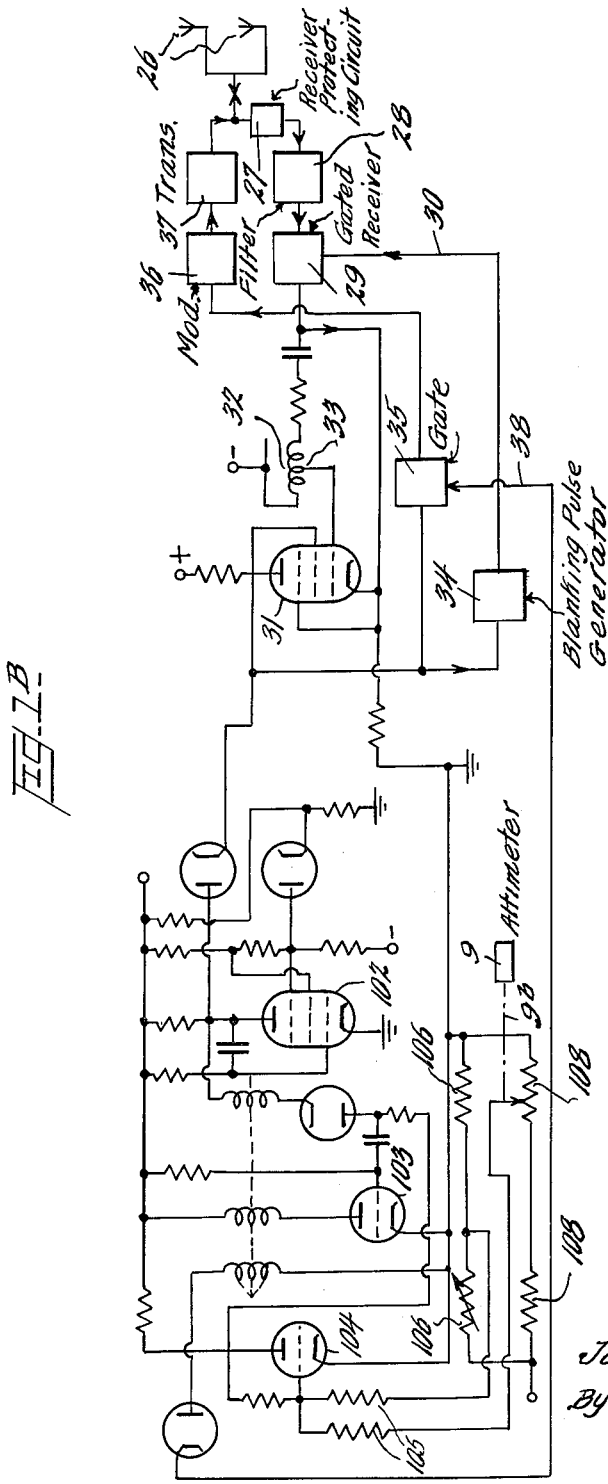

Sept. 19, 1961  J. WILD  3,001,188
ANTI-COLLISION RADIO EQUIPMENT FOR AIRCRAFT USE
Filed Oct. 23, 1958  3 Sheets-Sheet 3

INVENTOR:
Jack Wild
BY: Baldwin & Wight
his ATTORNEYS

United States Patent Office 3,001,188
Patented Sept. 19, 1961

---

3,001,188
ANTI-COLLISION RADIO EQUIPMENT
FOR AIRCRAFT USE
Jack Wild, Chelmsford, England, assignor to Marconi's Wireless Telegraph Company Limited, London, England, a British company
Filed Oct. 23, 1958, Ser. No. 769,264
Claims priority, application Great Britain Feb. 3, 1958
6 Claims. (Cl. 343—6.5)

This invention relates to anti-collision radio equipment for aircraft use and has for its object to provide improved and reliable equipments whereby the pilot of an aircraft can obtain warning if there is another similarly equipped aircraft fairly near him and flying at some height in which he is interested—usually, though not necessarily, the height at which he is himself flying. In its preferred embodiments the invention not only provides warning of the presence of another similarly equipped aircraft at a given height, but also provides information of the range and/or of the approximate direction of that other aircraft.

Aircraft anti-collision radio equipment in accordance with this invention may be designed to be to a high degree immune from interference by random signals from extraneous sources and is also inherently immune from interference due to double reception of the same radio signals, once over a direct path from aircraft to aircraft and a second time over a longer path which includes reflection at the earth's surface. Such double reception of the same radio signals owing to propagation over two paths of different lengths imposes serious difficulties in the way of producing satisfactory anti-collision aircraft radio equipments.

According to this invention an aircraft anti-collision radio equipment comprises means for transmitting an interrogating sequence of at least two pulsed transmissions time-spaced by an interval exceeding twice the radio propagation time over the maximum intended operating height, said interval consisting of a constant portion equal to twice said propagation time and a variable portion representative of a predetermined selected height; a radio receiver; means adapted to be actuated upon receipt of the first transmission of an interrogating sequence from a similarly equipped co-operating aircraft for rendering said receiver inoperative for a period equal to twice said propagation time over the maximum intended operating height; means adapted to be actuated upon receipt of said first transmission of said sequence from a co-operating aircraft for producing a control signal occurring later than said receipt by an amount substantially equal to twice said propagation time over the maximum intended operating height plus an additional time representative of and dependent on the flying height; a response signal transmitter; means jointly controlled by said receiver and said control signal for causing said response signal transmitter to transmit a response signal if the second transmission of the interrogating sequence from the co-operating aircraft is received at a predetermined time with reference to the time of production of said control signal; and means for receiving and indicating receipt of a response signal from a similarly equipped co-operating aircraft.

The invention thus provides equipment whereby the pilot of an aircraft is automatically notified (by receipt of a response signal) if there is another aircraft reasonably near him and flying at a given height which can be chosen as desired but will normally be his own flying height. Consider a practical case in which the pilot of an interrogating aircraft flying at, say, 15,000 feet, in an area in which the maximum operating height is 50,000 feet, desires to be warned of any aircraft flying in his neighbourhood and at or near his own height of 15,000 feet. He transmits a sequence of at least two pulsed transmissions of which the second occurs time-spaced from the first by a fixed interval portion of (approximately) 100 μsecs. plus a height-representing interval portion of (say) 60 μsecs., i.e. 160 μsecs. The fixed interval portion of 100 μsecs. is approximately equal to twice the radio propagation time over 50,000 feet—the maximum operating height. The height-representing interval portion of 60 μsecs. represents his flying height (15,000 feet), 4 μsecs. being assumed allowed for each 1000 feet. Any similarly equipped aircraft within radio range receives this sequence. Its equipment is so arranged that, on receipt of the first transmission in the sequence its receiver is rendered inoperative for a period of approximately 100 μsecs. so that any second reception of said transmission by reflection at the earth's surface is ineffective. Reception of the said first transmission is used to produce a control signal after a delay equal to 100 μsecs. plus an added delay dependent on and representative of the flying height of the second aircraft. If the receiving aircraft is also at 15,000 feet this control signal will be produced after a delay of 160 μsecs. At this time, however, the receiver will be operative and will receive the second transmission of the sequence from the interrogating aircraft. Such coincidence in time will occur between reception of the second transmission of the sequence and production of the control signal at the interrogated aircraft only if the flying height of the latter aircraft is that which was used to determine the time spacing of the two transmissions in the sequence from the interrogating aircraft. If such time coincidence occurs the interrogated aircraft transmits a response signal on a different frequency and this is received by the interrogating aircraft and employed to give its pilot a warning indication. Normally, in the interrogating aircraft, the height-representative portion of the time-spacing of the two transmissions in the sequence will be determined automatically by the aircraft's altimeter (which is set on the ground before flying commences from meteorological data in the usual way) and the time interval, in the interrogated aircraft, between reception of the first transmission of the sequence and production of the control signal there, is similarly determined by the altimeter carried by that aircraft. Thus, normally, the pilot of an interrogating aircraft will be warned of other aircraft flying at about the same height. However, in order to cover the case in which an interrogating aircraft intends to change height and requires to be warned of aircraft at any particular height (not necessarily its own flying height) each aircraft is provided with a manual control whereby the time spacing of the signals of an interrogating sequence can be chosen appropriately to any height with regard to which warning is required.

The height representative portions of the time spacing intervals need not be linearly related to height, i.e. need not be at a fixed time interval per 1000 feet over the whole range of flying heights. Indeed it is of practical advantage to use a smaller time spacing per 1000 feet at great heights than at low ones. Thus, to quote practical figures, an interval of 4 μsec./1000 feet could be used for heights between, say, 3,000 and 25,000 feet and an interval of only 2 μsec./1000 feet could be used for heights between say 25,000 and 45,000 feet. This is of advantage because it is more difficult in practice to maintain a given flying height at a higher altitude than at a lower one. Of course, whatever time-height scale is adopted, whether linear or not, it must be the same for all aircraft in the system.

Preferably each of the transmissions sent in an interrogating sequence consists of a train of at least two pulses—for example 1 μsec. pulses—spaced a short predetermined time apart—for example 4 μsec.—and the receiver for receiving interrogating signals is selectively responsive to such pulse trains. In this way the risk of interference by random pulses from other sources, such as radar transmitters, is much reduced.

Preferably each aircraft equipment also includes means for displaying received response signals (from co-operating aircraft) against a time base which is triggered by a predetermined signal in each interrogating sequence so that the position of the displayed received response signal along the time base is caused to be indicative of the range of the responding aircraft.

Preferably again each aircraft equipment comprises means for transmitting interrogating sequences in successively different directions of azimuth with course directivity and the means for displaying received response signals are arranged to indicate the particular direction in which any sequence responded to was sent.

Figure 3:
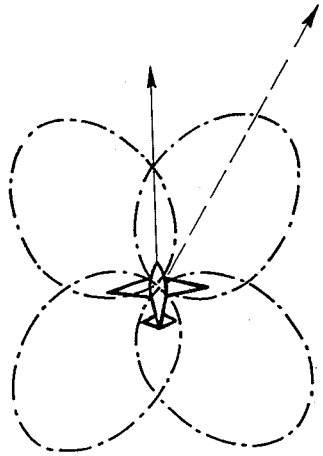
Figure 4:
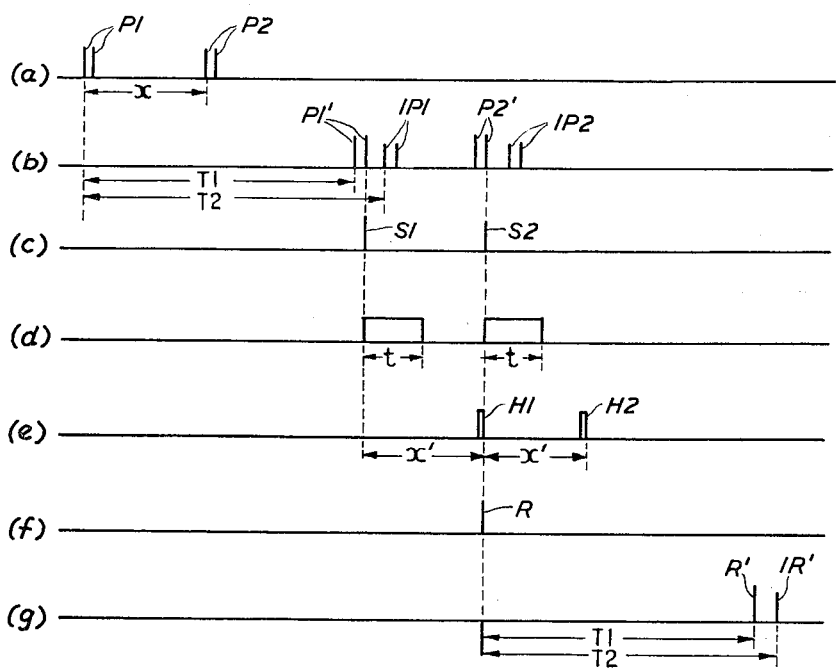

The invention is illustrated in the accompanying drawing in which FIGURES 1A and 1B are schematic diagrams respectively of the interrogating circuit and the responding circuit of the present invention fitted to one aircraft (it is to be understood that all other aircraft in the system will be fitted with similar equipment); FIGURE 2 is a representation of a response signal display such as might be given by an equipment as illustrated in FIGURE 1A; FIGURE 3 is a schematic diagram illustrating the nature of the directivity provided by the equipment shown in FIGURE 1A; and FIGURE 4 is a graphical diagram showing to the same time scale various signals derived at different stages of the operations performed by co-operating equipments each as shown in FIGURES 1A and 1B. In describing the equipment of FIGURE 1 certain numerical values of time will be given, but it is to be understood that these are by way of example only and in no sense limiting.

Referring to FIGURE 1A the equipment therein shown comprises a pulse generator 1 which may, for example, be a free running multivibrator, adapted to provide pulses at a predetermined repetition frequency of, for example, 10 pulses per second. The generator 1 need not be of high frequency stability. In fact it is of advantage, from the point of view of minimising risk of mutual interference between several interrogating aircraft, if the generator 1 is of poor frequency stability. It may indeed be arranged in known manner to be "jittered" in frequency by applying a small disturbing voltage to one of the multi-vibrator electrodes.

Pulses from the source 1 are applied to what may be termed a height coder network which produces from each input pulse an output pulse occurring after a time delay which consists of a fixed time portion and a variable height-representing time portion. The fixed time portion is chosen to be equal to twice the radio propagation time over the maximum operating height at which the aircraft is intended to fly. The variable time portion is a time period which is representative of height and may be, at the will of the pilot, either representative of the height at which the aircraft is actually flying, or of some other height in which the pilot is interested. This height coder network consists essentially of a known so-called monostable "Phantastron" circuit including the valve 2, a known so-called "multiar" amplitude comparator circuit including the valve 3, a known so-called virtual earth amplifier including the valve 4, a summation network comprising the resistances 5 and three potentiometers feeding each into a different one of the three resistances 5. One potentiometer includes the resistances 6; the second is a manually adjustable potentiometer and includes the resistances 7 with the slider 7a on one of them; and the third is a potentiometer including the resistances 8 with the slider 8a on one of them. The slider 8a is controlled by the normally provided altimeter 9 of the aircraft as indicated by the chain line 9a. For convenience in drawing the altimeter 9 is shown in two places in FIGURES 1A and 1B, but it is to be understood that the two blocks 9 both represent the same instrument. An examination of the circuit including the valves 2, 3 and 4 will show that when a pulse (assumed to be a positive going pulse) is fed from the source 1 to the phantastron circuit, the valve 2 will produce from the output coil 10 of the multiar circuit transformer a repeat pulse which is delayed with respect to the input pulse by a time determined by the summation of the voltages applied to the grid of the virtual earth amplifier 4 from the three potentiometers which are connected to that grid via the summation network 5. The coils of the multiar circuit transformer are represented at 10, 11 and 12 and their coupling by the dotted line arrow. The voltage applied from the potentiometer including the resistances 6 is set to provide a fixed component of time delay equal to twice the propagation time for radio over the maximum operating height. If this height is 50,000 feet approximately, the setting of the potentiometer comprising the resistances 6 will be such as to produce a fixed component of time delay substantially equal to 100 μsecs. The total time delay provided will be made up of this fixed component of time delay plus a height representative component determined by the settings of the sliders 7a and 8a. The altimeter controlled potentiometer may be arranged to provide a voltage such as will give an additional time delay of 4 μsecs./1000 feet of flying height over heights of from (say) 0 to 25,000 feet and a delay of 2 μsecs./1000 feet over the heights of (say) 25,000 to 50,000 feet. Thus, if the aircraft is flying at 26,000 feet, the voltage from the slider 8a could be such as to give an additional delay of 102 μsecs. (made up of 100 μsecs. for 25,000 feet of the height and 2 μsecs. for the odd 1000 feet) so that the total time delay (including the fixed component due to the voltage from the potentiometer including resistances 6) would be 202 μsecs. If, therefore, the slider 7a is out of use the height order will provide for each pulse fed into it from the source 1 a repeat pulse after a delay equal to 100 μsecs. plus a height-representing delay. In order, however, to meet the requirement that the pilot may wish to interrogate another aircraft in respect of some height other than that at which he himself is flying, there is provided the additional manual potentiometer including the resistances 7, the slider 7a of which is manually controlled so that the pilot may, by adjusting the said slider 7a, cause an additional height-representing time delay (which is added to the fixed 100 μsecs. delay) to be anything he chooses.

Pulses from the source 1 are also fed to the point 13 to which the delayed output pulses from the output coil 10 are also fed. This point 13 is the input terminal of what may be termed a twin-pulse generator which is adapted to produce from each pulse fed into it a corresponding output pulse followed at a predetermined constant short time interval by a further pulse. The twin-pulse generator comprises the valves 14 and 15. The valve 14 is normally cut off, but is rendered conductive by positive pulses applied at its grid. These positive pulses produce at its anode negative pulses which are applied to the grid of the valve 15 and also to one end of a delay line represented conventionally at 16 and having a short circuited termination. Each negative pulse fed into the delay line is of course reflected thereby as a positive pulse and appears at the input end of the line (after a short delay determined by said line) where it causes the valve 15 (which is normally cut off) to become conductive and produce a pulse at its cathode. If the electrical length of the delay line from one end to the other is 2 μsecs. (a practical figure) each input pulse at the terminal 13 will produce on the output lead 17 two similar positive pulses spaced apart by 4 μsecs. The twin pulses on the output lead 17 control a known modulator 18 which modulates a radio transmitter 19 operating on a predetermined carrier frequency F1, for example in the 1,000 to 2,000 mc./s. range.

The pulse modulated carrier is transmitted from an aerial system schematically represented in FIGURE 1A and comprising four differently directed coarsely directional aerials 20, 21, 22 and 23. Each of these aerials has broad directivity covering an angle of about 90° of azimuth. One is directed forward and to port, another forward to starboard, the third aft to starboard, and the fourth aft to port. The transmissions from the transmitter 19 are distributed round the four aerials in turn so that each aerial is used in turn to transmit an interrogating sequence. This distribution is represented conventionally by a distributing switch 24 controlled by a switch control unit 25 of any convenient known form as indicated by the chain line 25a.

It will now be seen that each pulse from the source 1 causes the transmitter 19 to transmit an interrogating sequence of two pairs of pulses, the pulses of each pair being separated by a short time interval (4 μsecs. in the example given above) and the pairs of pulses being separated by a time interval $x$ which is equal to 100 μsecs. plus an additional time representative of height and determined by the setting of the sliders 7a and 8a. This sequence of two pairs of pulses is represented at P1 and P2 in line $a$ of FIGURE 4. The operation of the switch 24 is such that a number of complete sequences as represented in line $a$ of FIGURE 4 is radiated from one aerial, say the aerial 20; a number of such sequences is then radiated from the second aerial; a number of sequences is then radiated from the third aerial . . . and so on cyclically round the aerials. The switching frequency may, for example, be 0.25 c./s.

There will now be described that part of the equipment of FIGURE 1B which is intended to receive a sequence such as that shown in line $a$ of FIGURE 4 and to respond to it if the interval between the pairs of pulses in the sequence corresponds to a height representative delay set up by the altimeter of the receiving aircraft.

Referring again to FIGURE 1B the receiving aerial system, which is omni-directional and is used also for response transmission (as will be described later) is represented at 26. This aerial system feeds through a receiver protecting circuit 27 (adapted to protect the receiving equipment from local transmission) to a frequency selective rejection filter 28 adapted to pass the predetermined carrier frequency F1 and reject the carrier frequency F2 from the transmitter 37 (to be referred to later). The filtered output from unit 28 is passed to a receiver 29 which is subjected to gating by pulses fed to it over lead 30. Assume for the moment that the receiver 29 is "open" i.e. able to pass received signals. Output signals from the said receiver 29 are fed to a circuit including the valve 31 and which is adapted to pass only twin pairs of pulses having the predetermined time spacing (4 μsecs.) of the pairs of pulses P1, P1 and P2, P2 in the sequence shown in line $a$ of FIGURE 4. As will be seen, pulses from receiver 29 are fed direct to the cathode of the valve 31 which is normally cut off. This pulse is, however, insufficient alone to cause the valve 31 to conduct and the said valve will conduct only if there is a positive pulse simultaneously on its control grid. The pulses from the receiver 29 are also fed into a delay line 32 which has a short circuited termination and will produce a reflected pulse at the tap 33. The line is of such length that the delay between the feeding of a pulse into the line 32 and appearance of a reflected pulse at the tap 33 is 4 μsecs., i.e. equal to the interval between the pulses P1 and between the pulses P2. Accordingly, while the first of a pair of pulses will not make the valve 31 conductive, the second of the pair will, because it is applied to the cathode of the valve 31 simultaneously with the application to the control grid of the reflection of the first pulse from the line 32. Accordingly, the second of a pair of pulses of the correct spacing will cause the valve 31 to produce an output pulse.

Output pulses from the valve 31 are fed to a known form of blanking pulse generator 34 which is triggered thereby and produces in response to each triggering pulse a blanking pulse 100 μsecs. long. This blanking pulse is fed over lead 30 to the receiver 29 to "close" the gate therein. The result is that on reception of the second pulse of the first pair of pulses P1 of a sequence as shown in line $a$ of FIGURE 4 the receiver 29 is rendered inoperative for 100 μsecs. The effect of this is to get rid of difficulty due to two-path transmission. Referring again to FIGURE 4, line $b$ represents the sequence of pulses as they might be received by an aircraft whose distance (expressed in direct propagation time) from the transmitting aircraft is given by the time interval T1. The pulses P1 of line $a$ of FIGURE 4 will be received as shown at P1' in line $b$ by direct propagation after a time interval T1 dependent on the distance between the two aircraft. Similarly the pulses P2 will be received by direct propagation as shown at P2'. In practice, however, pulses will also reach the receiving aircraft via reflection at the ground and accordingly the pair of pulses P1' will be followed by a second pair of pulses 1P1 arriving after a time interval T2 dependent on the length of the path via reflection. Similarly reception of the pulses P2 will be followed by a second reception as indicated at 1P2. However, the second pulse receptions at 1P1 and 1P2 are ineffective because, when they occur, the receiver 29 is inoperative by being blanked off during the periods $t$ of 100 μsecs. during which the repeated pulses 1P1 and 1P2 must be received. Line $c$ of FIGURE 4 shows the output pulses S1, S2 from the valve 31 which initiate blanking pulses as shown in line $d$ of FIGURE 4.

Output pulses from the valve 31 are also fed through a gate circuit 35 (when "open") to a modulator 36 which modulates a transmitter 37 operating on a second or response high frequency carrier F2 and feeding into the aerial system 26. Accordingly a response signal can only be sent if the gate 35 is open. This gate, which may be an ordinary coincidence gate, is controlled by control potentials fed to it over the lead 38. As will be seen later, the apparatus is so arranged that a control signal is fed over the lead 38 to open gate 35 if and only if the time interval between the pairs of pulses in a received sequence is the same or substantially the same (within a desired degree of accuracy) of a time interval consisting of a fixed time portion of 100 μsecs. plus a time representative of the height at which the receiving aircraft is flying. The control circuit for ensuring this action is also fed with the output pulses from the valve 31. It needs very little description because it closely resembles the circuit comprising the valves 2, 3 and 4, the adding network 5 and the potentiometers 6, 7 and 8 already described. The said circuit comprises a monostable phantastron circuit including the valve 102, a multiar amplitude comparator including the valve 103, a virtual earth amplifier including a valve 104, a summation network including the two resistances 105, and two potentiometers of which one comprises the resistances 106 (this provides fixed delay of 100 μsecs.) and the other comprises the resistances 108 on one of which is a slider 108a controlled by the altimeter 9 as indicated by the chain line 9b. Comparison of the circuitry including the elements 102, 103, 104, 105, 106 and 108 with the already described circuitry including the elements 2, 3, 4, 5, 6, 7 and 8 shows that the only practical difference lies in the fact that, in the former circuitry, the only element provided for introducing a height representative time component is the potentiometer comprising the resistances 108, there being no manual control corresponding to the potentiometer comprising the resistance 7. Accordingly the first (S1) of a sequence of two pulses from the valve 31 as shown in line $c$ of FIGURE 4 will produce on lead 38 a pulse H1 after a delay $x'$ determined by the reading of the altimeter 9 and consisting of 100 μsecs, plus an added delay dependent on that reading. If the height of the receiving aircraft is such that $x'=x$ (see line $a$ of FIGURE 4) the delayed pulse H1 will occur simultaneously with the second pulse S2 from the valve 31, the gate 35 will open and a response signal will be transmitted from the aerials 26. The second pulse S2 will also result in a correspondingly delayed pulse H2 as shown by line $e$ of FIGURE 4, but no use is made of this— in fact, preferably known means (not shown) are provided for eliminating it. The responder pulse transmitted from the aerial system 26 due to the simultaneous occurrence of the pulses S2 and H1 is represented in line $f$ of FIGURE 4 at R and as shown at R' in line $g$ of FIGURE 4 this will be received back at the interrogating aircraft by direct propagation after a time interval T1. It will probably be received again, after an interval T2, as shown at 1R' by reflection at the earth's surface, but this does not matter.

There now remains to be described the apparatus for displaying the received response signal R. The aerials 20, 21, 22, 23 are also used for receiving response signals on frequency F2. These response signals are fed via the distributing switch 24 and, if desired, through a receiver protecting device 39, to a adapted to reject filter 40 the frequency from the transmitter 19. This filter feeds a receiver 41, whose output is fed via a switch device represented by the block 42 to one of the co-ordinate deflection systems (shown as plates) of a cathode ray display tube 43. The other co-ordinate deflection system of the tube 43 is fed through a suitable switch device represented by the block 44 from a time base circuit 45 of known form which is triggered through a delay network 46 by the output pulse from the coil 10 of the multiar circuit including the tube 3. The switch devices 42 and 44 are controlled by the switch control mechanism 25 as represented schematically by the chain lines 47, and are arranged in manner which will be obvious to those skilled in the art, so that when either of the two forward looking aerials of the four aerials 20, 21, 22 and 23 is in use the time base deflection in the tube 43 is in one direction from the centre of the tube, while when either of the two rearward looking aerials is in use the time base deflection is in the opposite direction from the centre. The switching is also such that when either of the two starboard looking aerials is in use any received signal fed to the display tube will produce a deflection to the right of the time base line, while similarly when either of the two port looking aerials is in use the signal deflection will be to the left of the time base line. The delay provided by the delay line 46 is adjusted to take into account unavoidable circuit delays in the two equipments carried by the two co-operating circraft so that, despite such delays the distance from the centre of the display tube of any signal displayed thereby will be a measure of the direct propagation time between the two co-operating aircraft.

FIGURE 2 typifies a display given by the tube 43. In FIGURE 2 the line TB is the time base line and the "blip" B is a displayed response signal received from an aircraft which is forward and to starboard, i.e. received when the forward and starboard looking aerial is in use. The distance from the centre of a display to the "blip" B is indicative of the range of the aircraft; the fact that the "blip" appears in the forward direction and on the right hand side of the time base line TB indicates that the responding aircraft is forward and to starboard: and the fact that the "blip" appears at all indicates that the responding aircraft is at the height with respect to which interrogation was made, since otherwise the responding aircraft would not have responded. The second "blip" B' in FIGURE 2 is the response signal repeated by second reception over a path including reflection at the earth's surface.

FIGURE 3 is a diagram illustrating the conditions resulting in a display as shown in FIGURE 2. In FIGURE 3 the aircraft is the interrogating aircraft; the chain line patterns represent the approximate polar diagrams of the four aerials 20, 21, 22 and 23; and the broken straight line is pointing towards the responding aircraft.

I claim:
1. An aircraft anti-collision radio equipment comprising means for transmitting an interrogating sequence of at least two pulsed transmissions time-spaced by an interval exceeding twice the radio propagation time over the maximum intended operating height, said interval consisting of a constant portion equal to twice said propagation time and a variable portion representative of a predetermined selected height; a radio receiver; means adapted to be actuated upon receipt of the first transmission of an interrogating sequence from a similarly equipped co-operating aircraft for rendering said receiver inoperative for a period equal to twice said propagation time over the maximum intended operating height; means adapted to be actuated upon receipt of said first transmission of said sequence from a co-operating aircraft for producing a control signal occurring later than said receipt by an amount substantially equal to twice said propagation time over the maximum intended operating height plus an additional time representative of and dependent on the flying height; a response signal transmitter; means jointly controlled by said receiver and said control signal for causing said response signal transmitter to transmit a response signal if the second transmission of the interrogating sequence from the co-operating aircraft is received at a predetermined time with reference to the time of production of said control signal; and means for receiving and indicating receipt of a response signal from a similarly equipped co-operating aircraft.

2. An equipment as claimed in claim 1 wherein said means for transmitting an interrogating sequence of pulses includes a circuit arrangement adapted, in response to an input pulse, to produce an output pulse after a time interval, adjustable means in said circuit arrangement for controlling the value of said time interval above a value equal to twice the radio propagation time over the intended maximum operating height, an altimeter and means for adjusting said adjustable means in response to the height measured by said altimeter.

3. An equipment as claimed in claim 1 wherein said means for transmitting an interrogating sequence of pulses includes a circuit arrangement adapted, in response to an input pulse, to produce an output pulse after a time interval, adjustable means in said circuit arrangement for controlling the value of said time interval above a value equal to twice the radio propagation time over the intended maximum operating height and manually controlled means for adjusting said adjustable means.

4. An equipment as claimed in claim 1 wherein said means for transmitting an interrogating signal comprises a pulse source, a circuit arrangement fed with pulses from said pulse source and adapted, in response to a pulse fed thereto, to produce a further pulse after a time interval, means, fed with pulses from said pulse source and said circuit arrangement, for producing two output pulses separated by a predetermined time interval in response to each input pulse fed thereto, a transmitter and means for modulating said transmitter with said output pulses and wherein said receiver includes a normally closed gate and means responsive to the reception of two pulses separated by said predetermined time interval for opening said gate.

5. An equipment as claimed in claim 1 wherein said means for indicating receipt of a response signal comprises an indicating device having a time base sweep providing a range scale, means for triggering said time base sweep in synchronism with said interrogating sequence and means for applying received response signals to said indicating device to be indicated against said time base sweep.

6. An equipment as claimed in claim 1 wherein said means for transmitting an interrogating signal and said means for receiving a response signal include an aerial of variable directivity and means for varying the directivity of said aerial and wherein said means for indicating receipt of a response signal comprises an indicating device, means for applying received response signals to said device for indication therein and means, synchronized with said means for varying the aerial directivity, for controlling the indications in said indicating device in a manner characteristic of the direction of reception of said response signals.

No references cited.